US010121082B2

(12) United States Patent
Heisele et al.

(10) Patent No.: US 10,121,082 B2
(45) Date of Patent: Nov. 6, 2018

(54) SYSTEM AND METHOD FOR PROVIDING LASER CAMERA FUSION FOR IDENTIFYING AND TRACKING A TRAFFIC PARTICIPANT

(71) Applicant: Honda Motor Co., Ltd., Tokyo (JP)

(72) Inventors: Bernd Heisele, Mountain View, CA (US); Alper Ayvaci, Santa Clara, CA (US)

(73) Assignee: Honda Motor Co., Ltd., Tokyo (JP)

( * ) Notice: Subject to any disclaimer, the term of this patent is extended or adjusted under 35 U.S.C. 154(b) by 486 days.

(21) Appl. No.: 14/876,907

(22) Filed: Oct. 7, 2015

(65) Prior Publication Data

US 2017/0103269 A1    Apr. 13, 2017

(51) Int. Cl.
*G06K 9/00* (2006.01)
*B60R 1/00* (2006.01)
*G06T 7/70* (2017.01)

(52) U.S. Cl.
CPC ............ *G06K 9/00805* (2013.01); *B60R 1/00* (2013.01); *G06T 7/70* (2017.01); *B60R 2300/108* (2013.01); *B60R 2300/301* (2013.01); *G06T 2200/04* (2013.01); *G06T 2207/30252* (2013.01); *G06T 2210/12* (2013.01)

(58) Field of Classification Search
CPC ....................................................... G06K 9/00
See application file for complete search history.

(56) References Cited

U.S. PATENT DOCUMENTS

| 7,075,661 B2 | 7/2006 | Petty et al. |
| 7,486,803 B2 | 2/2009 | Camus |
| 7,777,669 B2 | 8/2010 | Tokoro et al. |
| 8,027,029 B2 | 9/2011 | Lu et al. |
| 9,576,185 B1* | 2/2017 | Delp .................. G06K 9/00201 |
| 2009/0268946 A1 | 10/2009 | Zhang et al. |
| 2013/0201052 A1 | 8/2013 | Saint Clair et al. |
| 2016/0267331 A1* | 9/2016 | Pillai .................. G06K 9/00791 |

OTHER PUBLICATIONS

Article: Wender, S., et al.: "3D Vehicle Detection Using a Laser Scanner and a Video Camera", Intelligent Transport Systems, IET, vol. 2, Issue 2, Jun. 2008, pp. 105-112 (Abstract).

* cited by examiner

*Primary Examiner* — Jeffery A Williams
*Assistant Examiner* — Patricia I Young
(74) *Attorney, Agent, or Firm* — Rankin, Hill & Clark LLP

(57) ABSTRACT

A system and method for providing laser camera fusion for identifying and tracking a traffic participant that include receiving an image of a surrounding environment of a vehicle and a set of object coordinates of at least one object determined within the surrounding environment of the vehicle. The system and method also include determining a portion of the image as object space based on the image and the set of object coordinates and filtering the object space to identify a traffic related object. Additionally, the system and method include determining a three dimensional position of the traffic related object and classifying the traffic related object as at least one of: the traffic participant, or a non-traffic participant. The system and method further include tracking the traffic participant based on a three dimensional position of the traffic related object classified as the traffic participant.

20 Claims, 9 Drawing Sheets

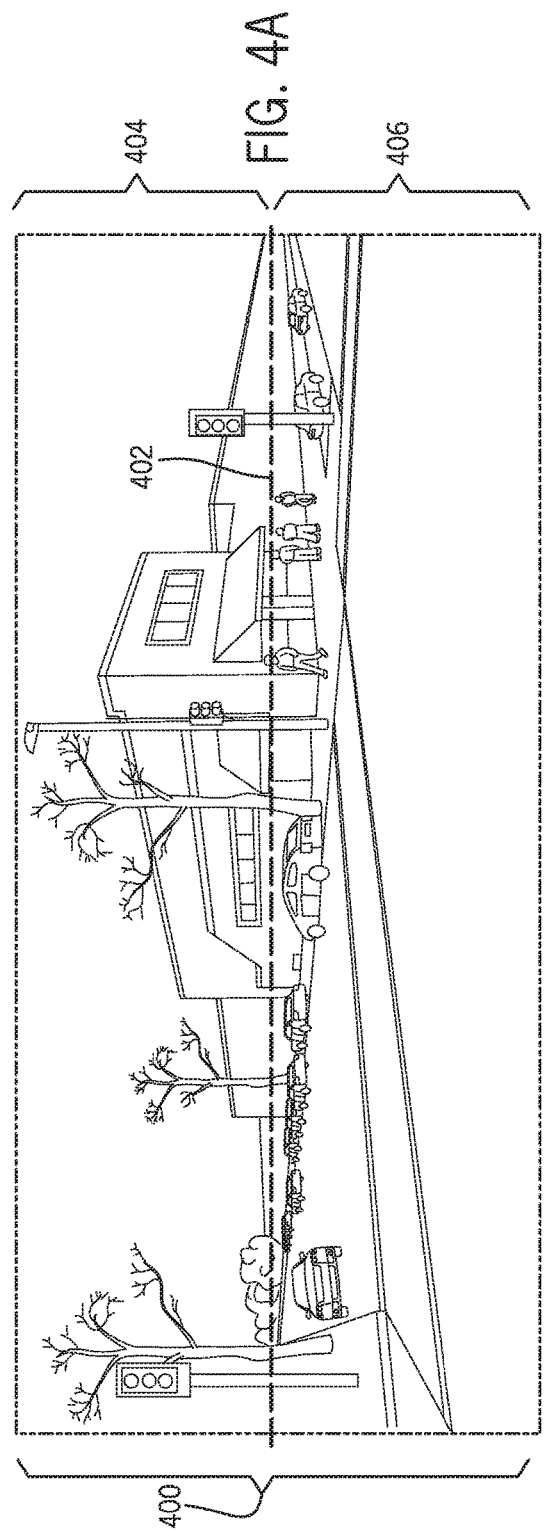
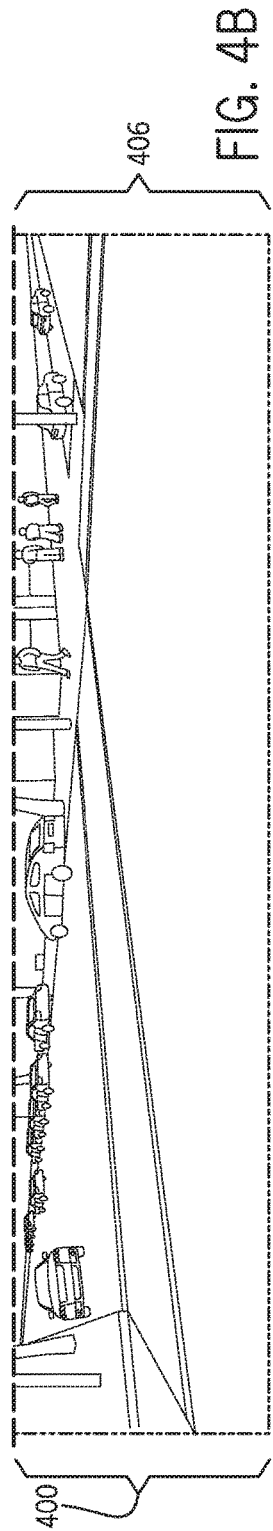

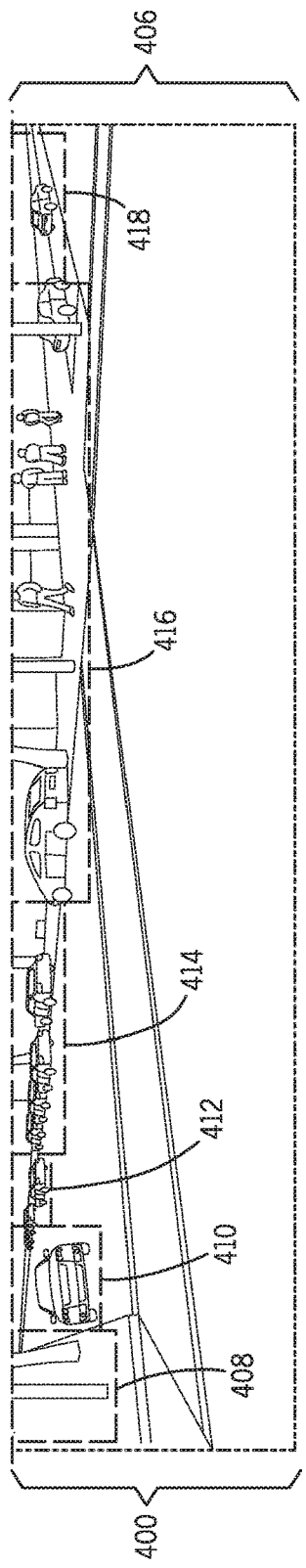
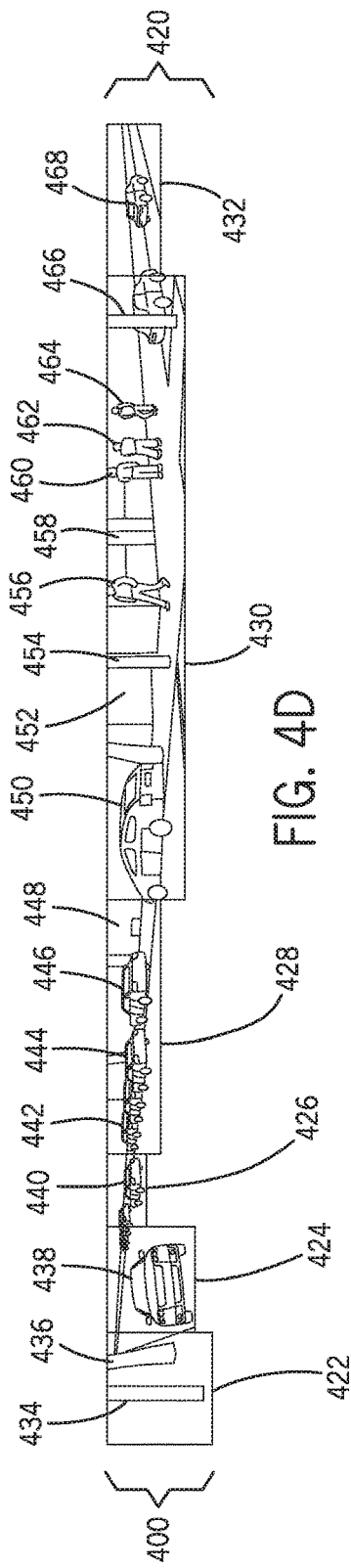

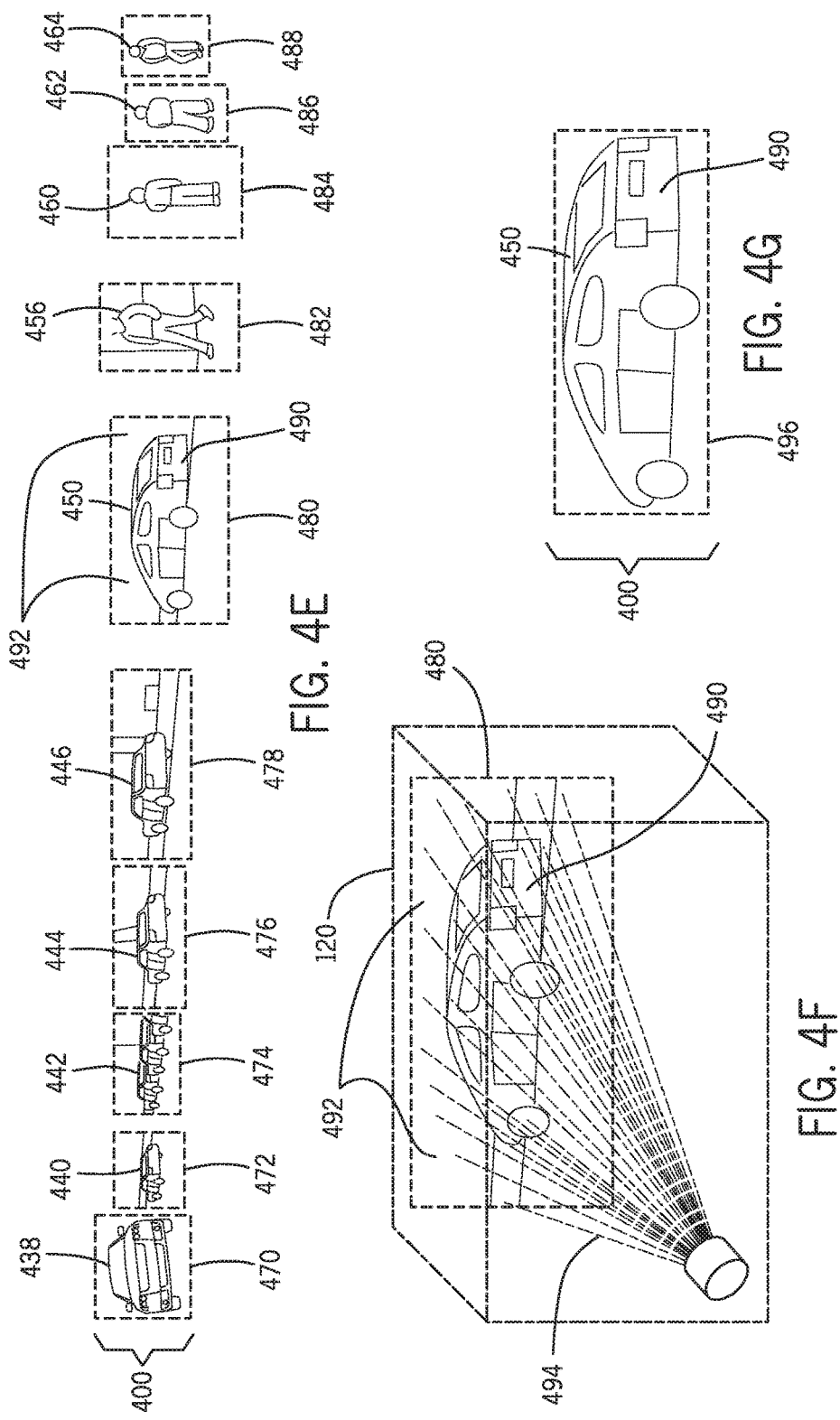

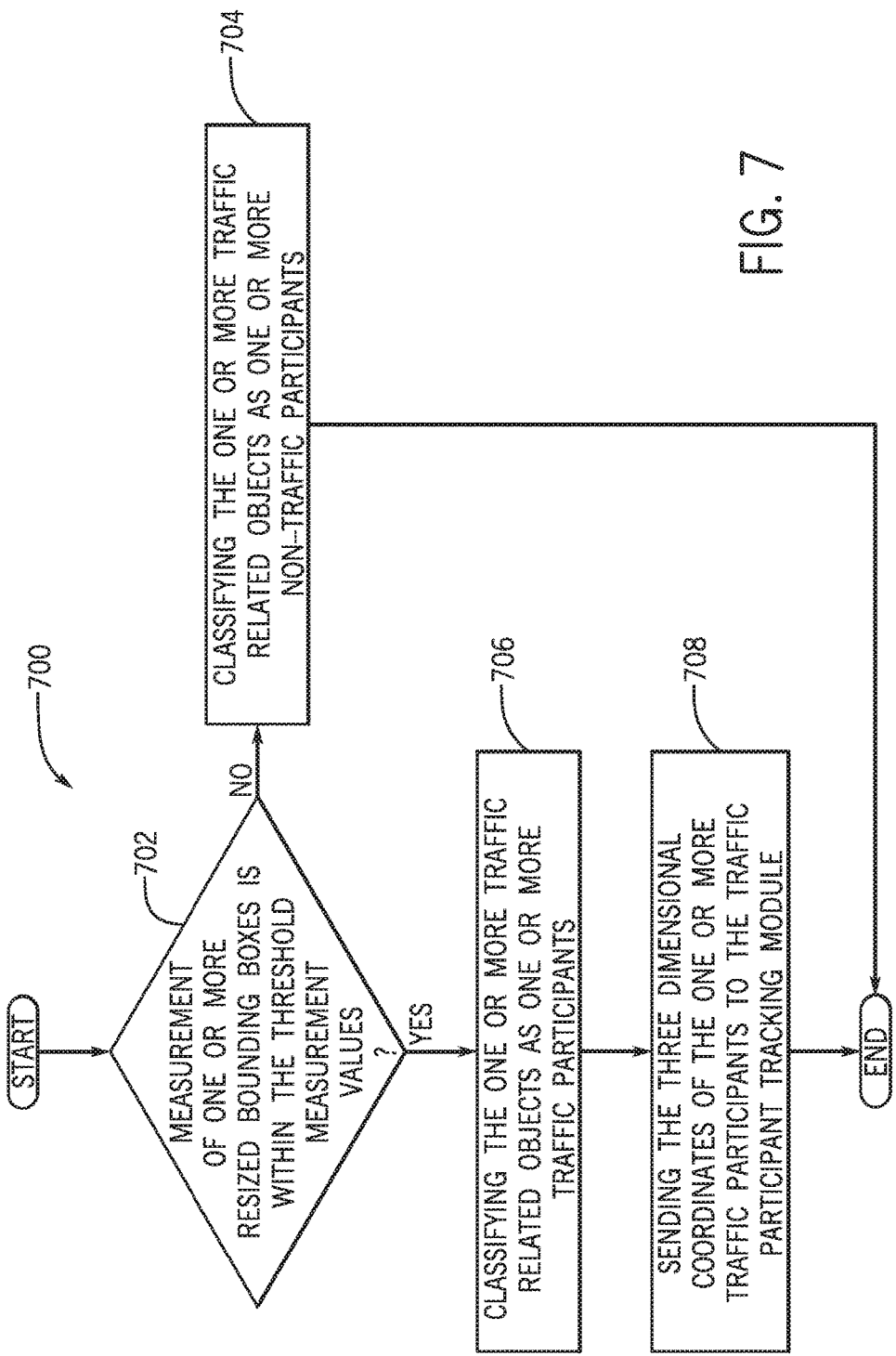

SYSTEM AND METHOD FOR PROVIDING LASER CAMERA FUSION FOR IDENTIFYING AND TRACKING A TRAFFIC PARTICIPANT

BACKGROUND

Generally, a vehicle driver may not be aware of traffic participants located within a surrounding environment of the vehicle. Current vehicle sensor technologies and safety systems can be utilized to sense traffic participants, such as pedestrians and other vehicles that are located within the surrounding environment of the vehicles, however, these sensor technologies and driver safety systems provide real time warnings when the potential of collision is imminent. Therefore, the driver may not be able to account for traffic participants that may not be seen beforehand by the driver until it is too late to take adequate preventative action to avoid a potential collision.

BRIEF DESCRIPTION

According to one aspect, a computer-implemented method for providing laser camera fusion for identifying and tracking a traffic participant that includes receiving an image of a surrounding environment of a vehicle from a vehicle camera system and a set of object coordinates of at least one object determined within the surrounding environment of the vehicle from a vehicle laser projection system. The method also includes determining a portion of the image as object space based on the image and the set of object coordinates and filtering the object space to identify a traffic related object. Additionally, the method includes determining a three dimensional position of the traffic related object and classifying the traffic related object as at least one of: the traffic participant, or a non-traffic participant. The method further includes tracking the traffic participant based on a three dimensional position of the traffic related object classified as the traffic participant, wherein a predicted position of the traffic participant relative to the vehicle is determined based on tracking the traffic participant.

According to a further aspect, a system for providing laser camera fusion for identifying and tracking a traffic participant is provided. The system includes a laser camera fusion application that is executed on an electronic control unit of a vehicle. The system also an image/object coordinate reception module that is included as a module of the laser camera fusion application that receives an image of a surrounding environment of the vehicle from a vehicle camera system and a set of object coordinates of at least one object determined within the surrounding environment of the vehicle from a vehicle laser projection system. The system additionally includes an object space determinant module that is included as a module of the laser camera fusion application that determines a portion of the image as object space based on the image and the set of object coordinates. Additionally, the system includes an object space filtering module that is included as a module of the laser camera fusion application that filters the object space to identify a traffic related object and a positional determinant module that is included as a module of the laser camera fusion application that determines a three dimensional position of the traffic related object. The system further includes a traffic participant classification module that classifies the traffic related object as at least one of: the traffic participant, or a non-traffic participant. The system also includes a traffic participant tracking module that tracks the traffic participant based on a three dimensional position of the traffic related object classified as the traffic participant, wherein a predicted position of the traffic participant relative to the vehicle is determined based on tracking the traffic participant.

According to still another aspect, a computer readable storage medium storing instructions that, when executed by a processor, perform actions, including receiving an image of a surrounding environment of a vehicle from a vehicle camera system and a set of object coordinates of at least one object determined within the surrounding environment of the vehicle from a vehicle laser projection system. The instructions also include determining a portion of the image as object space based on the image and the set of object coordinates and filtering the object space to identify a traffic related object. Additionally, the instructions include determining a three dimensional position of the traffic related object and classifying the traffic related object as at least one of: the traffic participant, or a non-traffic participant. The instructions further include tracking the traffic participant based on a three dimensional position of the traffic related object classified as the traffic participant, wherein a predicted position of the traffic participant relative to the vehicle is determined based on tracking the traffic participant.

BRIEF DESCRIPTION OF THE DRAWINGS

FIG. 4A is an illustrative example of a surrounding environment of the vehicle according to an exemplary embodiment;

FIG. 4B is an illustrative example of an image of a floor space of the surrounding environment of the vehicle according to an exemplary embodiment;

FIG. 4C is an illustrative example of the image of the floor space of the surrounding environment of the vehicle that includes bounding boxes according to an exemplary embodiment;

FIG. 4D is an illustrative example of an image of an object space of the surrounding environment of the vehicle that includes a plurality of objects according to an exemplary embodiment;

FIG. 4E is an illustrative example of an image of a plurality of bounding boxes that each include traffic related objects located within the surrounding environment of the vehicle according to an exemplary embodiment;

FIG. 4F is an illustrative example of an image laser projection system projecting a plurality of laser beam points to a bounding box according to an exemplary embodiment;

FIG. 4G is an illustrative example of a portion of an image that includes a resized bounding box that further includes the traffic related object according to an aspect of the present application;

FIG. 7 is a process flow diagram of an exemplary method for classifying the traffic related object from the operating environment of FIG. 1 according to an exemplary embodiment.

DETAILED DESCRIPTION

Figure 1:
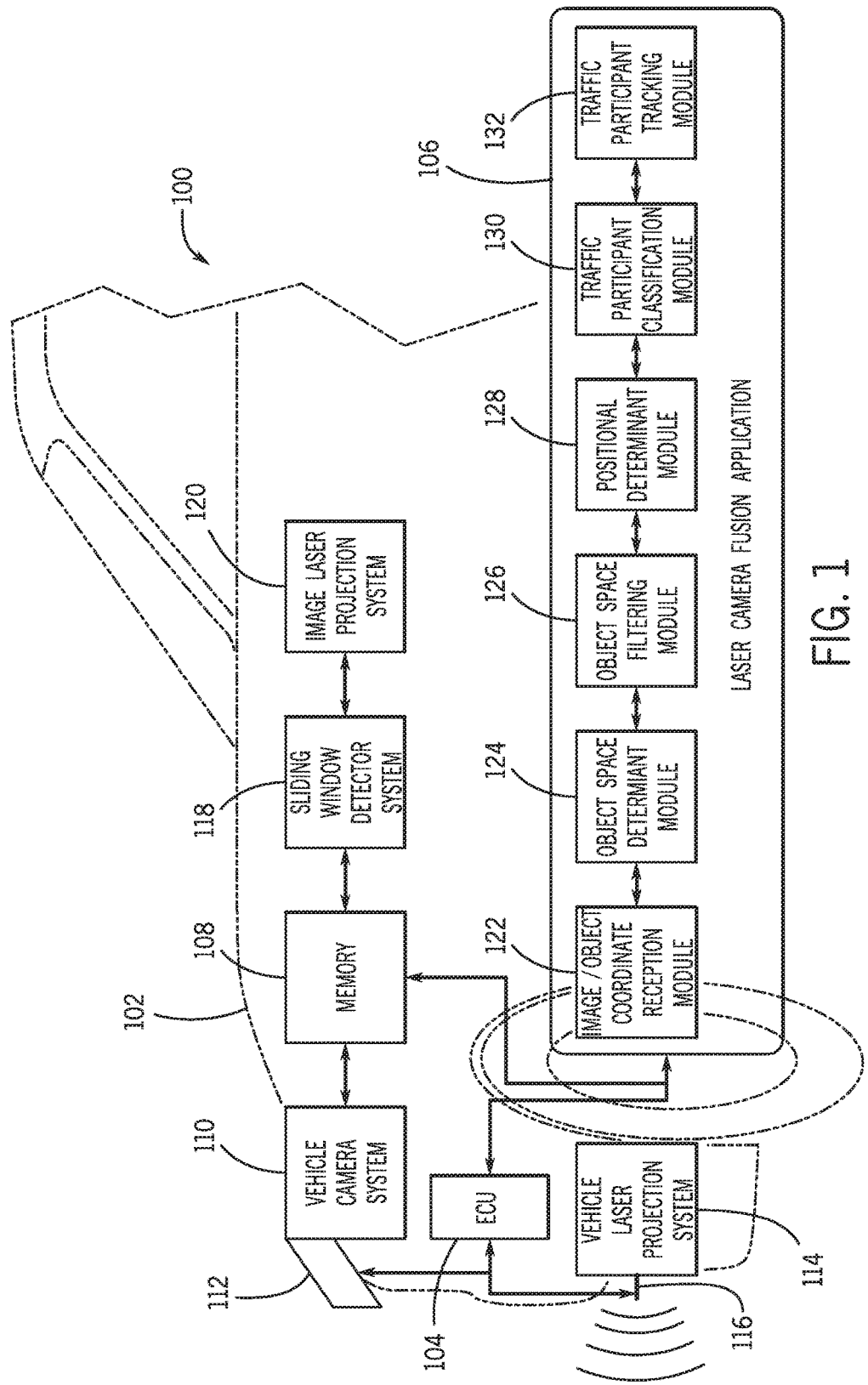
FIG. 1 is a schematic view of an exemplary operating environment for implementing systems and methods for providing laser camera fusion for tracking a traffic participant according to an exemplary embodiment.

The following includes definitions of selected terms employed herein. The definitions include various examples and/or forms of components that fall within the scope of a term and that can be used for implementation. The examples are not intended to be limiting.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications can be sent and/or received. An operable connection can include a wireless interface, a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

A "value" and "level", as used herein can include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting same, FIG. 1 is a schematic view of an exemplary operating environment 100 for implementing systems and methods for providing laser camera fusion for tracking a traffic participant according to an exemplary embodiment. The components of the environment 100, as well as the components of other systems, hardware architectures, and software architectures discussed herein, can be combined, omitted, or organized into different architectures for various embodiments.

Generally, the environment 100 includes a vehicle 102 with an electronic control unit (ECU) 104 that executes one or more applications, operating systems, vehicle system and subsystem user interfaces, among others. The ECU 104 can also execute a laser camera fusion application 106 that can be configured to track one or more traffic participants within a surrounding environment of the vehicle 102. The one or more traffic participants can include but are not limited to, motor vehicles including automobiles, trucks, buses, motorcycles, and the like, and vulnerable road users including pedestrians, bicyclists, and the like. In other words, the traffic participants can include movable objects that can be located and/or enter within one or more potential paths of the vehicle 102 within the surrounding environment of the vehicle 102 and may pose a risk of collision to the vehicle 102.

As will be described in more detail below, in or more embodiments, the laser camera fusion application 106 can utilize one or more images and one or more laser transmitting technologies to determine the presence of one or more traffic related objects within the surrounding environment of the vehicle 102 based on one or more objects that are determined within the image(s). The laser camera fusion application 106 can be configured to also utilize the one or more laser transmitting technologies to determine a three-dimensional position of the one or more traffic related objects determined to be present within the surround environment of the vehicle 102. Furthermore, the laser camera fusion application 106 can analyze the one or more traffic related objects to identify the one or more traffic related objects as one or more traffic participants (as described above) or one or more non-traffic participants. The one or more non-traffic participants can include objects found within the surrounding environment of the vehicle 102 including, but not limited to, buildings, trees, guardrails, street signs, etc., that are likely to be stationary objects that may not enter within one or more potential paths of the vehicle 102. Additionally, the laser camera fusion application 106 can also be configured to track the one or more traffic related objects classified as traffic participant(s) within the surrounding environment of the vehicle 102 based on the three dimensional position of the traffic participant(s).

Referring again to FIG. 1, the vehicle 102 can include a plurality of components, for example, a memory 108, a vehicle camera system 110 that is operably connected to one or more cameras 112, a vehicle light detection and ranging system (vehicle laser projection system) 114 that is operably connected to one or more LIDAR transceivers 116, a sliding window detector system 118, and an image laser projection system 120, among others.

The ECU 104 and each of the plurality of components of the vehicle 102 discussed above that are operably connected to the ECU 104, will now be discussed in more detail. In an exemplary embodiment, the ECU 104 can be configured to operably control the plurality of components of the vehicle 102. The ECU 104 can include a microprocessor, one or more application-specific integrated circuit(s) (ASIC), or other similar devices. The ECU 104 can also include internal processing memory, an interface circuit, and bus lines for transferring data, sending commands, and communicating with the plurality of components of the vehicle 102. The ECU 104 can also include a communication device (not shown) for sending data internally in the vehicle 102. Generally, the ECU 104 communicates with the memory 108 to execute the one or more applications, operating systems, vehicle systems and subsystem user interfaces, and the like that are stored within the memory 108.

The memory 108 can be configured to store one or more executable files associated with one or more operating systems, applications, associated operating system data, application data, vehicle system and subsystem user interface data, and the like that are executed by the ECU 104. In one or more embodiments, the memory 108 of the vehicle 102 can be accessed by the laser camera fusion application 106 to store data, for example, one or more images, one or more sets of object coordinates, one or more sets of image coordinates associated with objects, three dimensional coordinates associated with traffic participants, and traffic participant tracking data, among others.

The vehicle camera system 110 can include one or more cameras 112 that are positioned at one or more exterior and interior portions of the vehicle 102. The camera(s) 112 can be positioned in a direction to capture the surrounding environment of the vehicle 102. In an exemplary embodiment, the surrounding environment of the vehicle 102 can be defined as a predetermined area located in around (front/sides/behind) the vehicle 102 (e.g., road environment in front, sides, and/or behind of the vehicle 102) that can be included within the vehicle's travel path. The one or more cameras 112 of the vehicle camera system 110 can be disposed at external front and/or side portions of the vehicle 102, including, but not limited to different portions of the vehicle bumper, vehicle front lighting units, vehicle fenders, and the windshield. Additionally or alternatively, the one or more cameras 112 of the vehicle camera system 110 can be disposed at internal positions of the vehicle 102 including the vehicle dashboard (e.g., dash mounted camera), rear side of a vehicle rear view mirror, etc.

As stated above, the vehicle laser projection system 114 of the vehicle 102 can include one or more laser projection transceivers that can include but are not limited to one or more LIDAR transceivers 116. The one or more LIDAR transceivers 116 of the vehicle laser projection system 114 can be disposed at external front and/or side portions of the vehicle 102, including, but not limited to different portions of the vehicle bumper, vehicle front lighting units, vehicle fenders, and the windshield. Additionally or alternatively, the one or more LIDAR transceivers 116 of the vehicle laser projection system 114 can be disposed at internal positions of the vehicle 102 including the vehicle dashboard (e.g., dash mounted camera), rear side of a vehicle rear view mirror, etc.

The one or more LIDAR transceivers 116 can include one or more planar sweep lasers that can be configured to oscillate and emit one or more laser beams of ultraviolet, visible, or near infrared light toward the surrounding environment of the vehicle 102. The one or more LIDAR transceivers 116 can be configured to receive one or more reflected laser waves (e.g., signals) that are reflected off one or more objects included within the surrounding environment of the vehicle 102. In other words, upon transmitting the one or more laser beams to the surrounding environment of the vehicle 102, the one or more laser beams can be reflected as laser waves by one or more objects (e.g., motor vehicles, vulnerable road users, trees, buildings, etc.) that are located within the surrounding environment of the vehicle 102.

The vehicle laser projection system 114 can be configured to determine one or more sets of object reflectivity coordinates (sets(s) of object coordinates) (e.g., local coordinates, geographic coordinates (latitude, longitude, ellipsoid height), or geocentric coordinates (x,y,z, coordinates)) based on the reception of one or more reflected laser waves by the LIDAR transceiver(s) 116. More specifically, the vehicle laser projection system 114 can be configured to execute LIDAR logic to create LIDAR data that classifies set(s) of object coordinates from one or more objects located within the surrounding environment of the vehicle 102. The set(s) of object coordinates can indicate the range (e.g., distance from the vehicle 102) and angle from the objects (e.g., direction of the object with respect to the vehicle 102) off which the reflected laser waves were reflected. As will be described in more detail below, upon the LIDAR logic being utilized to determine and create LIDAR data that includes the set(s) of object coordinates, the vehicle laser projection system 114 can send LIDAR data to the laser camera fusion application 106 or save the LIDAR data to the memory 108 to be accessed by the application 106 to determine one or more objects that are included within the image(s) provided by the vehicle camera system 110.

In an exemplary embodiment, the sliding window detector system 118 can be configured to identify the existence of one or more traffic related objects and/or one or more non-traffic related objects within the surrounding environment of the vehicle 102. The sliding window detector system 118 can be configured to analyze the object(s) captured within the image(s) as provided by the vehicle camera system 110 and determined by the set(s) of object coordinates as provided by the vehicle laser projection system 114. In one or more embodiments, the traffic related objects can include objects that can potentially be identified as traffic participants that may enter one or more travel paths of the vehicle 102 (e.g., objects that are potentially motor vehicles and objects that are potentially vulnerable road users). Non-traffic related objects can include objects found within the surrounding environment of the vehicle 102 that may be immobile and not enter the one or more travel paths of the vehicle (e.g., buildings, trees, guardrails, street signs, etc.). In one embodiment, the sliding window detector system 118 can be preprogrammed with object models that represent values that include a range of sizes and features (within an image) of several types of objects. Additionally, the sliding window detector system 118 can be preprogrammed with traffic related object models that represent values that include a range of sizes and features (within an image) that are associated to different types of motor vehicles and vulnerable road users.

As will be described in more detail below, the laser camera fusion application 106 can utilize the sliding window detector system 118 to scan the one or more images at specific areas of the image(s) at positions that correspond to the set(s) of object coordinates detected within the surrounding environment of the vehicle 102 (included within the LIDAR data provided by the vehicle laser projection system 114). The sliding window detector system 118 can compare the image at the positions that correspond to the set(s) of object coordinates against the traffic related object models to identify one or more objects captured within the image(s) as traffic related object(s) or non-traffic related object(s). In other words, the sliding window detector system 118 can evaluate the image(s) of object(s) (whose existence was determined based on the laser waves reflected back to the LIDAR transceivers 116) against the size and feature values included within traffic related object models and can categorize one of more objects as traffic related objects or non-traffic related objects that can be further analyzed by the laser camera fusion application 106.

In one embodiment, the image laser projection system 120 can be included within a housing that is disposed at an area of the vehicle 102. The image laser projection system 120 can include one or more image pointing lasers (not shown) and a projection unit (not shown) that is configured to project one or more images. More specifically, the image laser projection system 120 can be configured to project the one or more images via the projection unit and further project one or more laser beam points towards the image(s) at one or more portions of the image(s) that are determined to include one or more traffic related objects.

As will be described in more detail below, the image laser projection system 120 can be configured to receive a command from the laser camera fusion application 106 to operate the one or more image pointing lasers to project one or more laser beams towards the projected image(s) to determine three dimensional positional coordinates of the one or more traffic related objects.

II. The Laser Camera Fusion Application and Related Methods

The components of the laser camera fusion application 106 will now be described according to an exemplary embodiment and with reference to FIG. 1. In an exemplary embodiment, the laser camera fusion application 106 can be stored on the memory 108 and executed by the ECU 104 of the vehicle 102. In another embodiment, the laser camera fusion application 106 can be stored on an externally hosted computing infrastructure (not shown) and can be accessed by the communication device of the ECU 104 to be executed by the ECU 104 of the vehicle.

The general functionality of the laser camera fusion application 106 will now be discussed. In an exemplary embodiment, the laser camera fusion application 106 can include an image/object coordinate reception module 122, an object space determinant module 124, an object space filtering module 126, positional determinant module 128, a traffic participant classification module 130, and a traffic participant tracking module 132.

Figure 2:
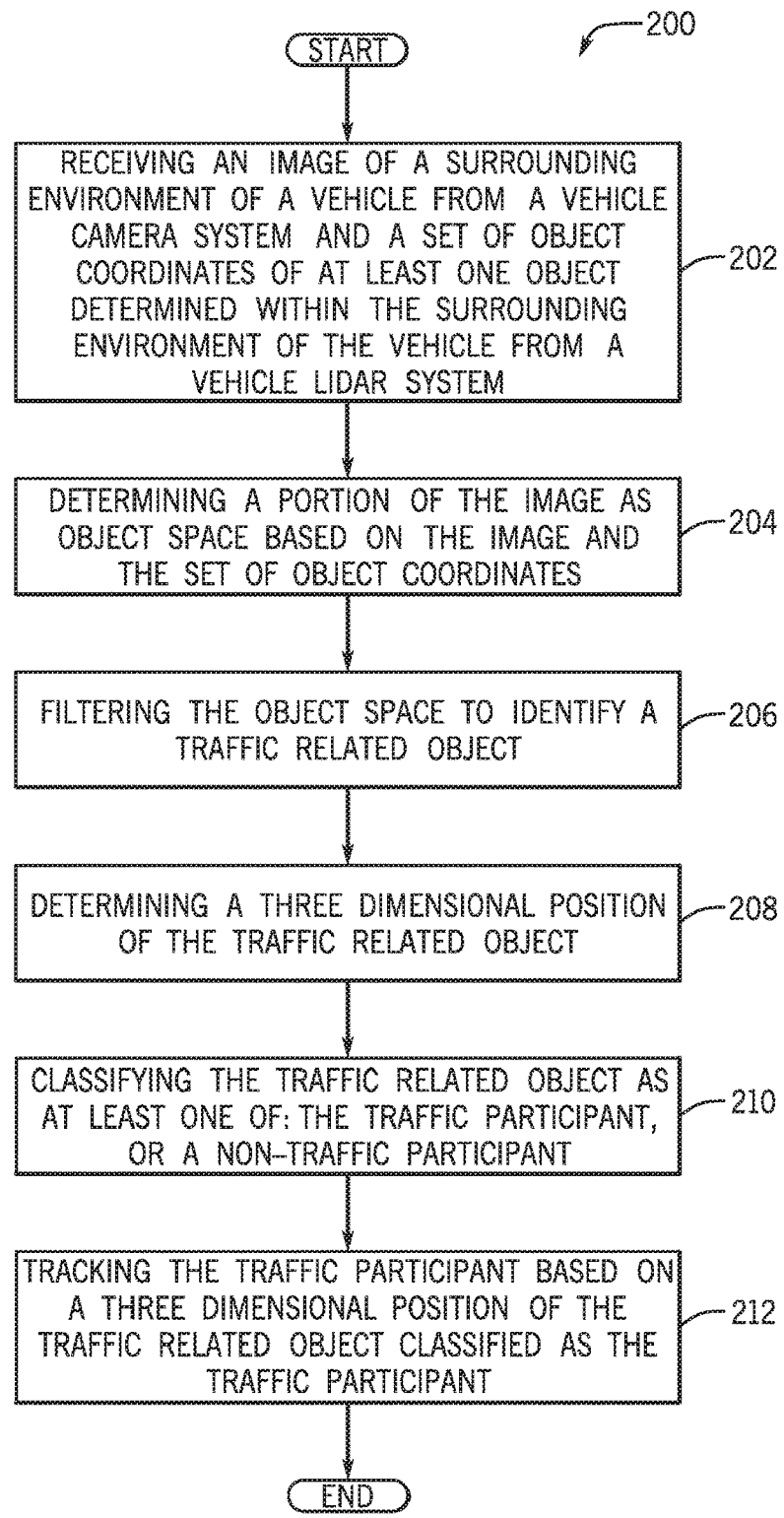
FIG. 2 is a process flow diagram of an exemplary method for providing laser camera fusion for tracking a traffic participant from the operating environment of FIG. 1 according to an exemplary embodiment.

Methods and examples describing process steps that are executed by the modules 122-130 of the laser camera fusion application 106 will now be described in more detail. FIG. 2 is a process flow diagram of a method 200 for providing laser camera fusion for tracking a traffic participant from the operating environment of FIG. 1 according to an exemplary embodiment. FIG. 2 will be described with reference to the components of FIG. 1, though it is to be appreciated that the method of FIG. 2 can be used with other systems/components. At block 202, the method includes receiving an image of a surrounding environment of a vehicle 102 from a vehicle camera system 110 and a set of object coordinates of at least one object determined within the surrounding environment of the vehicle 102 from a vehicle laser projection system 114. In an exemplary embodiment, upon the one or more camera(s) 112 capturing the image(s) of the surrounding environment of the vehicle 102, the vehicle camera system 110 can provide the one or more images captured by the camera(s) 112 directly to the image/object coordinate reception module 122 of the laser camera fusion application 106. Additionally, upon determining one or more sets of object coordinates based on analyzing the LIDAR data provided by the vehicle laser projection system 114, the image/object coordinate reception module 122 can send the one or more sets of object coordinates directly to the image/object coordinate reception module 122.

In an alternate embodiment, the image/object coordinate reception module 122 can communicate with the memory 108 to access the one or more images captured by the camera(s) 112 of the vehicle camera system 110, (saved on the memory 108 by the vehicle camera system 110). Additionally, the image/object coordinate reception module 122 can access and analyze the LIDAR data (saved on the memory 108 by the vehicle laser projection system 114) to determine one or more sets of objects coordinates.

At block 204, the method includes determining a portion of the image as object space based on the image and the set of object coordinates. In one embodiment, upon receiving or accessing the one or more images and the one or more sets of object coordinates, the image/object coordinate reception module 122 can provide the image(s) and the set(s) of objects coordinates to the object space determinant module 124. The object space determinant module 124 can evaluate the one or more images and the one or more sets of object coordinates to determine one or more portions of the respective image(s) that can be determined as object space.

Figure 3:
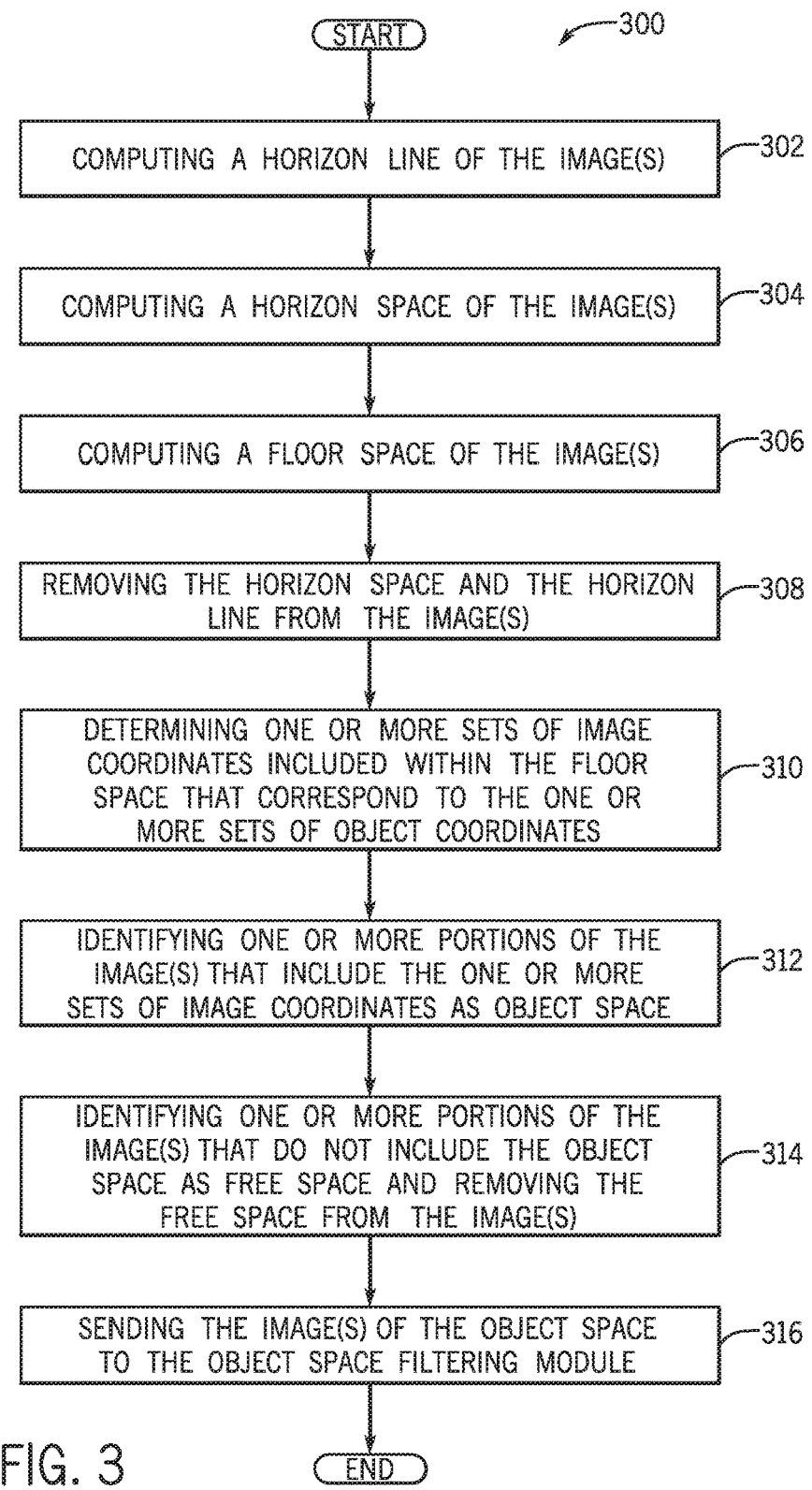
FIG. 3 is a process flow diagram of an exemplary method for determining a portion of an image as object space from the operating environment of FIG. 1 according to an exemplary embodiment.

Referring now to FIG. 3, a process flow diagram of a method 300 for determining a portion of the image as object space from the operating environment of FIG. 1 according to an exemplary embodiment. FIG. 3 will be described with reference to the components of FIG. 1, though it is to be appreciated that the method of FIG. 3 can be used with other systems/components. At block 302, the method includes computing a horizon line of the image(s). In one embodiment, upon receiving the image(s) from the image/object coordinate reception module 122, the object space determinant module 124 can evaluate the image(s) to compute the horizon line. The horizon line can be computed as a bordering line located at the portion of the image(s) that is located above a predetermined area within the image(s) where one or more potential traffic participants can be included (classified as floor space, as discussed below).

FIG. 4A is an illustrative example of an image 400 of the surrounding environment of the vehicle 102 according to an exemplary embodiment. As shown in FIG. 4A, the horizon line 402 can be computed in a middle portion of the image 400 located above a predetermined area where one or more traffic participants including motor vehicles and/or vulnerable road users can be captured within the image 400.

Referring again to FIG. 3, at block 304, the method includes computing a horizon space of the image(s). In one embodiment, upon computing the horizon line, the object space determinant module 124 can classify the horizon space as a portion of the image(s) that can be included above the horizon line that can include, but is not limited to, sky and/or object(s) that are located above the predetermined area where one or more traffic participants can be captured within the image(s). With reference again to FIG. 4A, the horizon space 404 is computed at portions of the image 400 that are located above the computed horizon line 402.

Referring again to FIG. 3, at block 306, the method includes computing a floor space of the image(s). In one embodiment, upon computing the horizon line, and the horizon space, the object space determinant module 124 can compute the floor space as a portion of the image(s) that are included below the horizon line that include the ground (e.g., roadway) directly in front of the vehicle 102 and an area where one or more traffic participants can be captured within the image(s). In other words, the floor space can include portions of the image(s) that are sized at or slightly above a maximum predetermined length (e.g., measurement) of one or more potential traffic participants captured within the image(s). With reference again to FIG. 4A, the floor space 406, can include portions of the image(s) including the ground on which the vehicle 102 is traveling, portions of the image(s) that include areas above the ground on which the vehicle 102 is traveling, and portions of the image(s) that are located below the horizon line 402.

Referring again to FIG. 3, at block 308, the method includes removing the horizon space and the horizon line from the image(s). In one embodiment, upon determining the horizon space and the floor space, the object space determinant module 124 can remove the horizon space and the horizon line from the image(s) to ensure that the horizon space is no longer analyzed when determining the portion of the image(s) as object space. In other words, by removing the horizon space and horizon line, the object space determinant module 124 can focus on one or more objects that can include traffic participants that are captured with portions of the floor space that can enter the travel path of the vehicle 102. Upon removing the horizon space and horizon line, the object space determinant module 124 can format (e.g., resize/decompress) the image(s) to only include the floor space. FIG. 4B is an illustrative example of the image 400 of the floor space 406 of the surrounding environment of the vehicle 102 according to an exemplary embodiment. With reference to FIGS. 4A and 4B, the object space determinant module 124 can remove portions of the image 400 that include the horizon space 404 and the horizon line 402 and format the image 400 that includes the floor space 406, as shown in FIG. 4B.

Referring again to FIG. 3, at block 310, the method includes determining one or more sets of image coordinates included within the floor space that correspond to the one or more sets of object coordinates. In one embodiment, the object space determinant module 124 can access a preprogrammed LIDAR coordinate map (not shown) from the memory 108. The preprogrammed LIDAR coordinate map can include one or more sets of two-dimensional image coordinates (e.g., image coordinates) that correspond to one or more sets of object coordinates. The object space determinant module 124 can utilize the preprogrammed LIDAR coordinate map to evaluate the one or more sets of object coordinates and determine one or more corresponding sets of image coordinates. The sets of image coordinates can include two dimensional (x,y) coordinates that represent one or more pixels of the image(s) that correspond to the location of one or more objects within the image that are associated to the set(s) of object coordinates.

At block 312, the method includes identifying one or more portions of the image(s) that include the one or more sets of image coordinates as object space. In an exemplary embodiment, the object space determinant module 124 can identify the one or more remaining portions of the image(s) of the floor space that represent the one or more sets of image coordinates as object space. In other words, the portions of the image(s) of the floor space that correspond to one or more sets of object coordinates of objects that reflect laser beam waves back to the LIDAR transceivers 116 of the vehicle laser projection system 114 are identified as object space.

In one embodiment, the object space determinant module 124 can compute one or more bounding boxes around the one or more portions of the floor space of the image(s). The object space determinant module 124 can identify portions of the image(s) of the floor space included within the one or more bounding boxes as as object space to distinguish the object space from other portions of the image(s) of the floor space that do not include one or more objects. The one or more computed bounding boxes can include enclosing shapes around one or more object(s) that can be part of a continuous portion(s) of the image(s) of the floor space. In other words, the bounding boxes can be computed at one or more continuous portions of the image(s) of the floor space that include objects that are positioned in a very close vicinity to one another.

FIG. 4C is an illustrative example of the image 400 of the floor space 406 of the surrounding environment of the vehicle 102 that includes bounding boxes 408-418, according to an exemplary embodiment. As shown in FIG. 4C, the image 400 of the floor space 406 includes a plurality of objects that are identified based on a plurality of sets of image coordinates that correspond to sets of object coordinates (as provided by the image/object coordinate reception module 122 to the object space determinant module 124). The plurality of objects within the computed bounding boxes 408-418 can include one or more traffic participants (e.g., motor vehicles, vulnerable road users) and one or more non-traffic participants (e.g., buildings, lamp posts).

Referring again to FIG. 3, at block 314, the method includes identifying one or more portions of the image(s) that do not include the object space as free space and removing the free space from the image(s). In one embodiment, upon identifying the object space included within the image(s) of the floor space and computing the one or more bounding boxes, the object space determinant module 124 can identify the remaining portions of the image(s) as free space. Upon identifying the free space, the object space determinant module 124 can remove the free space from the image(s). The object space determinant module 124 can format the image(s) (e.g., resize/decompress) of the floor space to only include object space (i.e., portions of the floor space that contains one or more objects) to be further utilized by the laser camera fusion application 106.

FIG. 4D is an illustrative example of the image 400 of the object space 420 of the surrounding environment of the vehicle 102 that includes a plurality of objects 434-468, according to an exemplary embodiment. The image 400 includes object space that is identified by object space determinant module 124. In other words, the image 400 of the object space only represents portions of the image 400 of the floor space 406 (of FIG. 4C) that were included within the bounding boxes 408-418 containing the plurality of objects 434-468 (e.g., buildings, trees, vehicles, pedestrians, etc. that are captured within the image 400), as computed by the object space determinant module 124.

Referring again to FIG. 3, at block 316, the method includes sending the image(s) of the object space to the object space filtering module 126. Upon formatting the image(s) by removing the free space from the image(s) of the floor space, the object space determinant module 124 can send the one or more images of the object space to the object space filtering module 126 to be analyzed further.

Referring again to the method 200 of FIG. 2, upon determining the portion of the image as object space, at block 206, the method includes filtering the object space to identify a traffic related object. In an exemplary embodiment, upon receiving the one or more image(s) of the object space from the object space determinant module 124, the object space filtering module 126 can filter the object space within the image(s) to identify the one or more of the objects as one or more traffic related objects or one or more non-traffic related objects.

Figure 5:
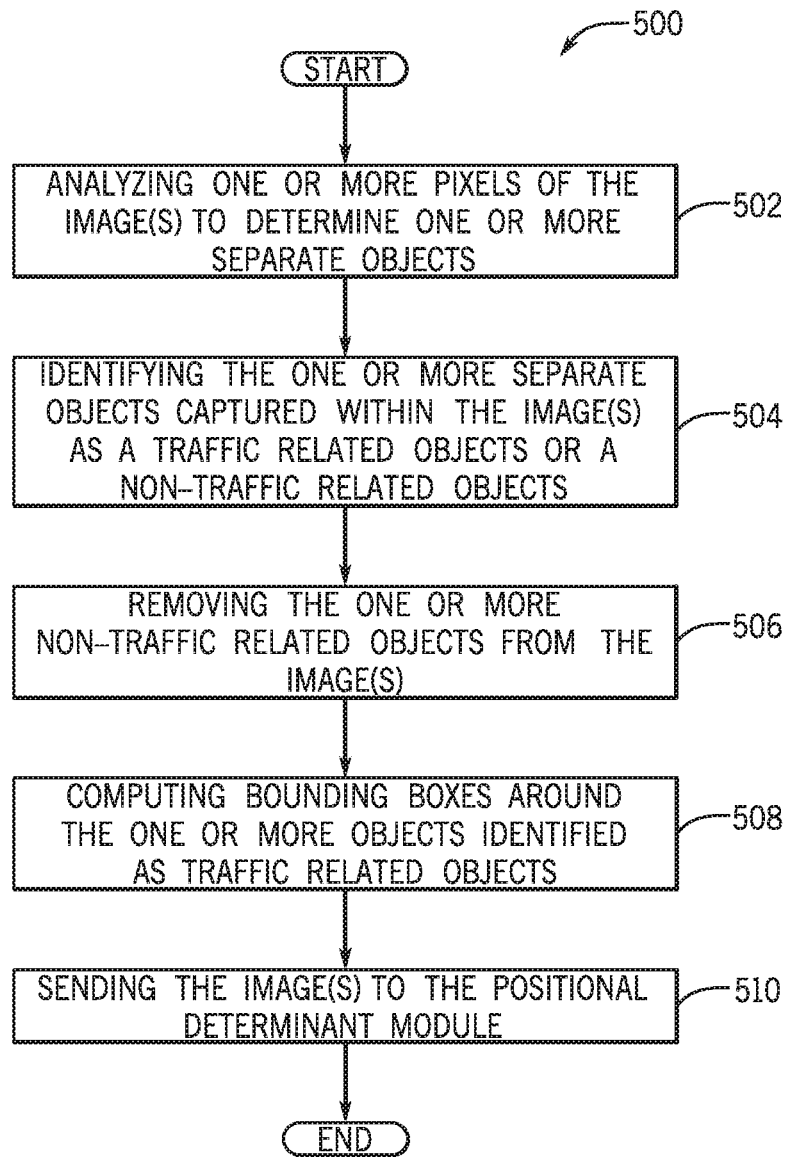
FIG. 5 is a process flow diagram of an exemplary method for filtering the object space to identify a traffic related object from the operating environment of FIG. 1 according to an exemplary embodiment.

Referring now to FIG. 5, a process flow diagram of a method 500 for filtering the object space to identify a traffic related object from the operating environment of FIG. 1 according to an exemplary embodiment. FIG. 5 will be described with reference to the components of FIG. 1, though it is to be appreciated that the method of FIG. 5 can be used with other systems/components. At block 502, the method includes analyzing one or more pixels of the image(s) to determine individual objects. In one embodiment, the image(s) of the object space received by the object space filtering module 126 can include one or more objects that can be located at one or more object space portions of the object space in a continuous manner. In other words, the image(s) can include one or more object space portions that include one or more objects found in close vicinity to one another (e.g., as represented in FIG. 4D). The object space portion(s) can include coordinates that correspond to the coordinates (areas) of the bounding box(es) (e.g., represented in FIG. 4C) computed by the object space determinant module 124 when determining the object space within the image(s).

In one embodiment, the object space filtering module 126 can utilize the sliding window detector system 118 to scan the object space portion(s) of the image(s) to analyze each of the pixels that are included within (each of) the one or more object space portions to determine one or more separate objects that exist within the object space portion(s). As discussed above, the sliding window detector system 118 can be preprogrammed with object models. The object space filtering module 126 can utilize the sliding window detector system 118 to compare the one or more objects found within the object space portion(s) against the object models to determine one or more separate objects that exist within the object space portion(s). In some embodiments, to ensure that processing time is saved by determining relevant objects that may be located within a predetermined (closer) vicinity to the vehicle 102, the sliding window detector system 118 can be preprogrammed with object models that represent objects located at a certain predetermined distance from the vehicle 102. The object space filtering module 126 can compare the one or more objects located within the one or more object space portions to the object models to determine one or more separate objects that are located a predetermined distance from the vehicle 102.

As an illustrative example, with reference again to FIG. 4C, continuous portions of objects captured within the image 400 were included within the bounding boxes 408-418. With further reference to FIG. 4D, upon formatting the image 400, the continuous portions of objects (that were included within the bounding boxes 408-418) can be presented in object space portions 422-432 of the image 400 of the object space 420. The object space filtering module 126 can utilize the sliding window detector system 118 to analyze each of the pixels that are included within each of the object space portions 422-432 to determine one or more separate objects that exist within the object space portions 422-432. The one or more separate objects can include trees, motor vehicles, pedestrians, buildings, among others.

Referring again to FIG. 5, at block 504, the method includes identifying the one or more separate objects captured within the image(s) as traffic related objects or non-traffic related objects. In an exemplary embodiment, upon the object space filtering module 126 determining one or more separate objects, the object space filtering module 126 can again utilize the sliding window detector system 118 to compare each location of the image(s) of the object space that includes the one or more separate objects against the traffic related object models (e.g., as discussed above). The sliding window detector system 118 can transmit one or more positive indications that are assigned to one or more separate objects to the object space filtering module 126. The one or more positive indications are transmitted when one or more locations of the image(s) of the object space that include the one or more separate objects matches the traffic related object models. Alternatively, the sliding window detector system 118 can transmit one or negative indications that are assigned to the one or more separate objects to the object space filtering module 126. The one or more negative indications are transmitted when one or more locations of the image(s) of the object space that include the one or more separate objects do not match the traffic related object models. In other words, the positive indications are transmitted from the sliding window detector system 118 when one or more associated separate objects match the traffic related object models to determine the existence of one or more traffic related objects within the image. Therefore, the object space filtering module 126 can translate the positive indications to identify the one or more associated separate objects as traffic related objects. Additionally, the object space filtering module 126 can translate the negative indications to identify one or more associated separate objects as non-traffic related objects.

Referring again to FIG. 5, at block 506, the method includes removing the one or more non-traffic related objects from the image(s). In one embodiment, upon identifying the one or more traffic related objects and the one or more non-traffic related objects located within the object space portion(s) of the image(s), the object space filtering module 126 can filter the image(s) by removing the portion(s) of the image where one or more non-traffic related objects are located. This can ensure that the one or more non-traffic related objects are not further analyzed by the application 106. The object space filtering module 126 can format the image(s) (e.g., resize/decompress) of the object space to only include portions of the object space that include the one or more traffic related objects to be further utilized by the laser camera fusion application 106.

At block 508, the method includes computing bounding boxes around the one or more objects identified as traffic related objects. In an exemplary embodiment, upon removing the one or more non-traffic related objects from the image(s) of the object space, the object space filtering module 126 can compute one or more bounding boxes around the one or more traffic related objects identified by the object space filtering module 126 (at block 504). More specifically, the one or more bounding boxes can include enclosing shapes around a plurality of pixels that make up the portion of the image(s) that include (each of) the traffic related object(s).

With reference to FIG. 4E, an illustrative example of the image 400 of a plurality of bounding boxes 470-488 that each include traffic related objects located within the surrounding environment of the vehicle 102, according to an exemplary embodiment. As shown in FIG. 4E, the image 400 includes the bounding boxes 470-488 that are computed for the objects 434-446, 450, 456, 460-464 that are identified as traffic related objects by the object space filtering module 126. As represented in FIG. 4E, the object space filtering module 126 filters the image 400 and removes portions of the image 400 that include objects 434, 436, 448, 452, 454, 458, 466, 468 (shown in FIG. 4D) that are identified as non-traffic related objects. Therefore, the formatted image 400 shown in FIG. 4E only includes the objects 434-446, 450, 456, 460-464 included within the bounding boxes 470-488.

Referring again to FIG. 5, at block 510, the method includes sending the image(s) to the positional determinant module 128. Upon formatting the images by removing the one or more non-traffic related objects from the image(s), the object space filtering module 126 can send the one or more images to the positional determinant module 128 to be analyzed further.

Referring again to FIG. 2, upon filtering the object space to identify a traffic related object, at block 208, the method includes determining a three dimensional position of the traffic related object. Upon receiving the one or more formatted images from the object space filtering module 126, the positional determinant module 128 can utilize the image laser projection system 120 to determine three dimensional positions of the one or more traffic related objects identified by the object space filtering module 126 (i.e., located in the surrounding environment of the vehicle 102). The positional determinant module 128 can determine the three dimensional position within the surrounding real world environment of the vehicle 102 based on real world three dimensional coordinates of the one or more traffic related objects captured within the image(s).

As discussed above, the one or more bounding boxes computed by the object space filtering module 126 can each include one or more objects identified as the traffic related object(s). However, upon computing the one or more bounding boxes around the identified traffic related objects, portions of the image(s) that include the traffic related object(s) within the bounding box(es) can also include portions of one or more objects that are located behind other object(s). For example, with reference again to FIG. 4E, the bounding box 480 corresponding to an identified traffic related object 450 is identified by the object space filtering module 126 (based on the utilization of the sliding window detector system 118). However, as shown, the bounding box 480 that includes the identified traffic related object 450 actually includes multiple objects in the form of a foreground object 490 (i.e., a motor vehicle) and portions of a background object 492 (i.e., portions of a building) located directly behind the foreground object 490 within the bounding box 480.

With reference again to FIG. 1, in order to determine a true three dimensional position of the traffic related object, the positional determinant module 128 utilizes the image laser projection system 120 to ensure that the three dimensional position of the traffic related object includes objects found closest to the camera(s) 112 of the vehicle camera system 110 (e.g., foreground objects) so that objects that appear behind the objects found closest to the vehicle 102 (e.g., background objects) within the bounding box(es) are not further analyzed by the laser camera fusion application 106. Moreover, the positional determinant module 128 ensures that only the three dimensional position(s) of the traffic related object(s) that have a high likelihood of being a true profile of the traffic participant(s) within the image(s) are further analyzed by the application 106.

Figure 6:
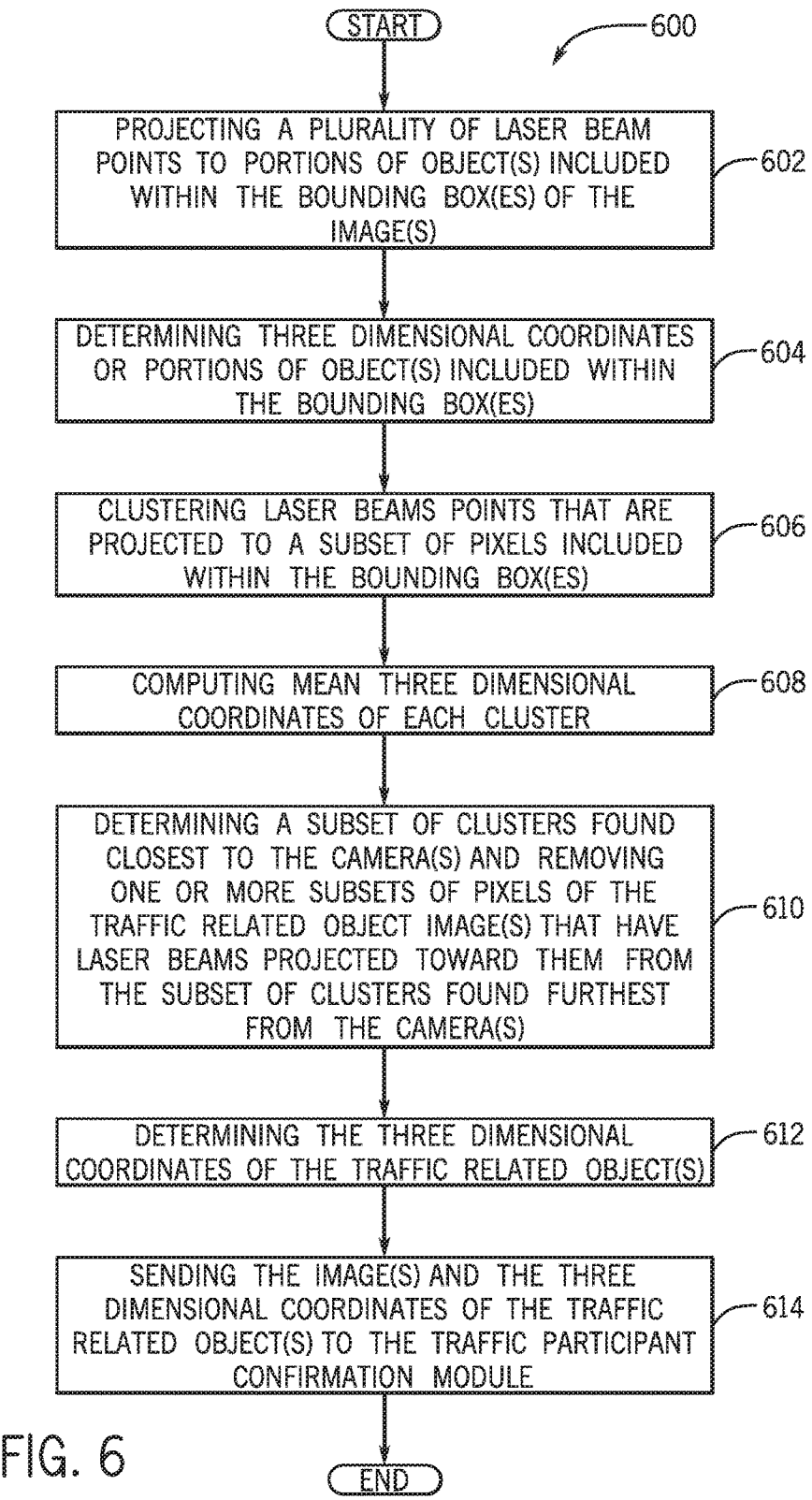
FIG. 6 is a process flow diagram of an exemplary method for determining a three dimensional position of the traffic related object from the operating environment of FIG. 1 according to an exemplary embodiment.

Referring now to FIG. 6, a process flow diagram of a method 600 for determining a three dimensional position of the traffic related object from the operating environment of FIG. 1 according to an exemplary embodiment. FIG. 6 will be described with reference to the components of FIG. 1, though it is to be appreciated that the method of FIG. 6 can be used with other systems/components. At block 602, the method includes projecting a plurality of laser beam points to portions of object(s) included within the bounding box(es) of the image(s). In an exemplary embodiment, upon receiving the one or more images from the object space filtering module 126, the positional determinant module 128 can utilize the image laser projection system 120 to project the image(s) and operate the one or more image pointing lasers to project a plurality of laser beam points towards the image(s). More specifically, the image laser projection system 120 can project the one or more images and project multiple laser beam points to the plurality of pixels (that include portions of the object(s) located) included within the bounding box(es) of the image(s).

FIG. 4F is an illustrative example of the image laser projection system 120 projecting a plurality of laser beam points 494 to the bounding box 480, according to an exemplary embodiment. For purposes of simplicity, FIG. 4F only illustrates the bounding box 480 of the formatted image 400 (illustrated in FIG. 4E), however, it is to be appreciated that the positional determinant module 128 can also utilize the image laser projection system 120 to project the plurality of laser beam points to the additional bounding boxes 476-484, 488-494 of the image 400. As shown, the image laser projection system 120 can project the plurality of laser beam points 494 towards the bounding box 480 corresponding to the identified potential traffic participant at locations that include the foreground object 490 and the background object 492.

With reference again to FIG. 6, at block 604, the method includes determining three dimensional coordinates of the portions of object(s) included within the bounding box(es). In one embodiment, the positional determinant module 128 can analyze the bounding box(es) of the image(s) to identify the plurality of pixels that are included within the bounding box(es) that include (each of) the traffic related object(s). The positional determinant module 128 can determine the two-dimensional coordinates of the portions of each of the plurality of pixels included within the bounding box(es) and can further apply projective geometry, trigonemetcial surveys, and/or vector analysis to determine three-dimensional positional data in a form of three-dimensional coordinates. More specifically, three dimensional real world coordinates (e.g., x, y, z coordinates) can be determined for each pixel of the plurality of pixels included within the bounding box(es) that corresponds to the real world position of object(s) (e.g., foreground and background objects) included within the bounding box(es) corresponding to the identified traffic related object(s).

At block 606, the method includes clustering laser beam points that are projected to a subset of pixels included within the bounding box(es). In one embodiment, the positional determinant module 128 can cluster laser beam points that are projected at a subset of pixels (e.g., two or more pixels) of the bounding box(es) based on the proximity of laser beam points projected at the object(s) within the bounding box(es). In other words, a subset of laser beam points can be clustered into a matrix (e.g., 100×100 matrix) and the clusters can be positioned a predetermined distance apart from each other (e.g., 0.5 m). Therefore, clusters of laser beam points are each directed towards subsets of pixels located at various areas of the bounding box(es).

At block 608, the method includes computing mean three dimensional coordinates of each cluster. In one embodiment, upon the positional determinant module 128 clustering the laser beam points to the subset of pixels within the bounding box(es), the positional determinant module 128 can compute mean three dimensional coordinates of each cluster. More specifically, the positional determinant module 128 can evaluate the three dimensional coordinates of the object(s) captured at each pixel (as determined at block 604) of the subset pixels that (each of) the cluster(s) of laser beam points is projected towards and can associate the three dimensional coordinates to each laser beam point projected towards the respective pixel. The positional determinant module 128 can further determine the mean three dimensional coordinates for each cluster by determining the mean three dimensional coordinates of (all of) the laser beam points that are included within the cluster(s) and can assign the determined mean three dimensional coordinates to the respective cluster(s).

At block 610, the method includes determining a subset of clusters found closest to the camera(s) and removing one or more subsets of pixels of the traffic related objects that have laser beam points projected toward them from the subset of clusters found furthest from the camera. In one embodiment, each laser beam point of each cluster can include a laser beam length that is determined based on a point the laser beam reaches an object within the image (e.g., at an end point of the laser beam). As described above, portions of the bounding box(es) that correspond to the traffic related object(s) can include portions of one or more foreground objects and background objects. The laser beam length of laser beam points that are projected towards object(s) within the bounding box(es) located closest to the camera(s) (e.g., foreground objects) are determined to have shorter laser beam lengths and are determined to have a high likelihood of being a true profile of the traffic participant(s) within the image(s). Alternatively, the laser beam lengths of laser beams that are projected towards object(s) that are located furthest from the camera (e.g., background objects) are determined to have longer laser beam lengths and are determined to have a low likelihood of being a true profile of the traffic participant(s) within the image(s). In one embodiment, upon clustering the laser beam points, the positional determinant module 128 can determine a mean laser beam length measurement of the cluster(s) by evaluating the length measurement of each of the laser beam point(s) of the cluster(s) and determining a mean length value of all of the laser beam points of the cluster(s).

As an illustrative example, with reference again to FIG. 4F, some of the laser beam points of the plurality of laser beam points 494 that are projected toward the foreground object 490 include a shorter laser beam lengths than the laser beam points that are projected to other portions of the bounding box 480 that include the background object 492. Therefore, the laser beams pointing towards the foreground object 490 are found closest to the camera(s) 112 and the foreground object 490 is determined to have a higher likelihood of being a true profile of the traffic participant.

With reference again to FIG. 1, in one embodiment, the positional determinant module 128 can store (on the memory 108) and access a predetermined traffic participant laser length value (predetermined laser length value) to determine if one or more objects that have laser beam point(s) projected towards them are found closest or furthest from the camera(s) 112. The predetermined laser length value can include a measurement value that corresponds to a measurement of a laser beam point at respective three dimensional coordinate values of the surrounding environment of the vehicle 102 that are determined to be closer to the camera(s) 112. Therefore if the measured length of laser beam point(s) are determined to be less (shorter) than or equal to the predetermined laser length value, one or more objects that have the laser beam point(s) projected to them are determined to be closer to the camera(s) 112. Alternatively, if laser beam point(s) are determined to be more (longer) than the predetermined laser length value, one or more objects that have the laser beam point(s) projected to them are determined to be further from the camera(s) 112.

In one embodiment, the positional determinant module 128 can evaluate the mean three dimensional coordinates for each cluster of laser beams (as determined at block 608) and can further evaluate the mean laser beam length of each cluster against the one or more predetermined laser length values to determine the subset of clusters found closest to the camera(s) and the subset of clusters found furthest from the camera(s) 112. In one embodiment, upon determining the mean laser beam length of subsets of clusters found closest and further to/from the camera(s) 112, the positional determinant module 128 can remove one or more subsets of pixels of the image(s) that have laser beams projected toward them from the subsets of clusters with the mean laser beam length found furthest from the camera(s) 112. Additionally, the positional determinant module 128 can keep one or more subsets of pixels of the bounded box(es) that have laser beams projected toward them from the subsets of clusters with the mean laser beam length found closest to the camera(s) 112. In other words, one or more pixels included within the subset of pixels within the bounding box(es) that include object(s) located further from the camera(s) 112 (e.g., background objects) are removed from the bounded box(es)/image(s). Also, one or more pixels included within the subset of pixels within the bounded box(es) that includes object(s) located closer to the camera(s) 112 (e.g., foreground objects) are kept within the bounded box(es)/image(s).

In one embodiment, the positional determinant module 128 can compute resized bounding box(es) and can format the image(s) (e.g., resize/decompress) to include the resized bounding box(es) around the object(s) that are included within the one or more subsets of pixels of the image(s) that are kept by the positional determinant module 128. Each resized bounding box can include a respective traffic related object and can include the one more pixels included within the subset of pixels within the bounded box(es) that includes object(s) located closer to the camera(s) 112 (e.g., foreground object(s) that is determined to have a high likelihood of being a true profile of the traffic participant(s) within the image(s)).

FIG. 4G is an illustrative example of a portion of the image 400 that includes a resized bounding box 496 that includes the traffic related object 450. For exemplary purposes and purposes of simplicity, FIG. 4G only illustrates the resized bounding box 496, however, it is to be appreciated that the formatted image 400 can include one or more additional resized bounding boxes that include additional traffic related object(s). As shown, the positional determinant module 128 removed one or more subsets of pixels of the bounding box 480 (shown in FIG. 4E) of the traffic related object 450 that included the background object 492. In other words, the one or more pixels of the bounding box 480 that included the background object 492 were determined to have laser beam points projected toward them from clusters with the mean laser beam length found furthest from the camera(s) 112. As represented in FIG. 4G, the one or more pixels of the bounding box 480 that included the background object 492 are removed by the positional determinant module 128. Therefore, the resized bounding box 496 of the image 400 only includes the foreground object 490 (determined to have laser beam points projected toward it from clusters with the mean laser beam length found closest to the camera(s) 112).

With reference again to FIG. 6, at block 612, the method includes determining the three dimensional coordinates of the traffic related object(s). In one embodiment, upon computing the resized bounding box(es), the positional determinant module 128 can aggregate the mean three dimensional coordinates computed for each cluster (determined at block 608) that is projected toward the pixels included within (each of) the resized bounding box(es) including the traffic related object within the resized bounded box(es). The positional determinant module 128 can determine the aggregated mean three dimensional coordinates as the three dimensional coordinates of the traffic related object(s).

At block 614, the method includes sending the image(s) and the three dimensional coordinates of the traffic related object(s) to the traffic participant classification module 130. Upon formatting the image(s) and computing the one or more resized bounding boxes, the object space determinant module 124 can send the one or more images and three dimensional coordinates associated to (each of the) traffic related object(s) included within the resized bounding box(es) to the traffic participant classification module 130.

With reference back to FIG. 2, upon determining a three dimensional position of the traffic related object, at block 210, the method includes classifying the traffic related object as at least one of: the traffic participant, or a non-traffic participant. In one embodiment, the traffic participant classification module 130 can store (e.g., on the memory 108) and access one or more minimum threshold measurement values and maximum threshold values that represent a range of sizes of traffic participants within the image (e.g., for pedestrians a minimum height of 1.3 m/maximum height of 2.1 m, a minimum width of 0.5 m/maximum width of 1 m). The threshold measurement values can be based on the distance of the potential traffic participant(s) from the vehicle 102 as determined by the three dimensional coordinates of various locations within the surrounding environment of the vehicle 102.

Referring now to FIG. 7, a process flow diagram of a method 700 for classifying the traffic related object from the operating environment of FIG. 1 according to an exemplary embodiment. FIG. 7 will be described with reference to the components of FIG. 1, though it is to be appreciated that the method of FIG. 6 can be used with other systems/components.

At block 702, the method includes determining if the measurement of one or more resized bounding boxes is within the threshold measurement values. In one embodiment, upon receiving the image(s) that include the resized bounding box(es) from the positional determinant module 128, the traffic participant classification module 130 can determine the measurement of one or more resized bounding boxes. Upon determining the measurement of the one or more resized bounding boxes, the traffic participant classification module 130 can compare the measurement of the resized bounding box(es) against the threshold measurement values to determine if the measured size of the one or more resized bounding boxes included within the image(s) are within the minimum threshold measurement values and the maximum threshold values. More specifically, the traffic participant classification module 130 can analyze the size(s) of the revised bounding box(es) to determine if the size (e.g., length and width) of the revised bounding box(es) is between the threshold measurement values, above the maximum threshold value, or below the minimum threshold value.

If it is determined that the measurement of one or more resized bounding boxes is not within the threshold measurement values (at block 702), at block 704, the method includes classifying the one or more traffic related objects as one or more non-traffic participants. Upon comparing the measurement of the resized bounding box(es) against the threshold measurement values, if the traffic participant classification module 130 determines that one or more resized bounding boxes are above the maximum threshold measurement value or below the minimum threshold measurement value, the traffic participant classification module 130 can classify the traffic related object(s) included within the respective resized bounding box(es) as non-traffic participants. For example, the non-traffic participants can include traffic related object(s) that were determined have a high likelihood of being a true profile of the traffic participant(s) but instead include other types of object(s) (e.g., false positives determinations that can include lamp posts, trees, etc.).

If it is determined that the measurement of one or more resized bounding boxes is within the threshold measurement values (at block 702), at block 706, the method includes classifying the one or more traffic related objects as one or more traffic participants. Upon comparing the measurement of the resized bounding box(es) against the threshold measurement values, if the traffic participant classification module 130 determines that measurement of the one or more resized bounding boxes is between the minimum threshold value and the maximum threshold value, the traffic participant classification module 130 can classify the traffic related object(s) included within the respective resized bounding box(es) as the traffic participant(s).

As an illustrative example, with reference again to FIG. 4G, the traffic participant classification module 130 can analyze the measurement of the resized bounding box 496 included within the image 400 to determine if the measurement (e.g., measured length/width) of the resized bounding box 496 is within the threshold measurement values or is not within the threshold measurement values that correspond to the three dimensional coordinates of the traffic related object 450. In this example, the traffic participant classification module 130 can determine that the measurement of the resized bounding box(es) is within the threshold measurement values if the length and width measurement of the resized bounding box 496 is above the minimum threshold measurement value and below the maximum threshold measurement value. Therefore, the traffic participant classification module 130 can classify the traffic related object 450 as a traffic participant.

With reference again to FIG. 7, at block 708, the method includes sending the three dimensional coordinates of the one or more traffic participants to the traffic participant tracking module 132. In one embodiment, if the traffic participant classification module 130 classifies the traffic related object(s) as the traffic participant(s) (at block 706), the traffic participant classification module 130 can send the three dimensional coordinates of the one or more traffic related objects classified as traffic participants to the traffic participant tracking module 132 to be further analyzed. The traffic participant classification module 130 can additionally remove data pertaining to the one or more classified non-traffic participants to ensure that the laser camera fusion application 106 does not use processing power and/or time to track non-traffic participants.

With reference again to FIG. 2, upon classifying the traffic related object, at block 212, the method includes tracking the traffic participant based on a three dimensional position of the traffic participant classified as the traffic participant. In one embodiment, upon receiving the three dimensional coordinates of the one or more traffic related objects classified as traffic participants, the traffic participant tracking module 132 can track the traffic participant(s) based on associated three dimensional coordinates and a velocity determined for the traffic participant(s). In one embodiment, the traffic participant tracking module 132 can utilize updated three dimensional coordinates of the one or more traffic related objects classified as one or more traffic participants provided at a future (e.g., next) time frame (e.g., at a future point in time 400 ms later) by the traffic participant classification module 130. In other words, the traffic participant tracking module 132 can utilize updated three dimensional coordinates of the one or more traffic participants after the modules 122-130 of the laser camera fusion application 106 complete a new iteration of the process steps 202-210 of FIG. 2 at the future time frame. The traffic participant tracking module 132 can utilize the three dimensional coordinates of the one or more traffic related objects classified as one or more traffic participants at more than one time frame to determine updated three dimensional coordinates of the traffic participant(s). For example, the data provided by the traffic participant classification module 130 at the future time frame can include updated three dimensional coordinates of each of the one or more traffic participants.

In one embodiment, the traffic participant tracking module 132 can analyze the updated three dimensional coordinates of the traffic participant(s) provided by the traffic participant classification module 130 at the future time frame against the previous three dimensional coordinates of the respective traffic participant(s) provided by the at one or more previous time frames to determine a difference in distance traveled. The traffic participant tracking module 132 can utilize the difference in distance traveled based on the time between time frames to estimate an average velocity of the traffic participant(s). In other words, the traffic participant tracking module 132 can evaluate the difference in distance traveled based on the time between time frames and can estimate an average velocity based on a prediction that a similar distance(s) will be traveled by the traffic participant(s) during future time frame(s).

As discussed above, the set(s) of object coordinates provided by the vehicle laser projection system 114 to the laser camera fusion application 106, can indicate the range (e.g., distance from the vehicle 102) and angle from the objects (e.g., direction of the object with respect to the vehicle 102) off which the reflected laser waves were reflected. In one embodiment, the traffic participant tracking module 132 can additionally communicate with the vehicle laser projection system 114 to receive the set(s) of object coordinates provided by the vehicle laser projection system 114 of object(s) within the surrounding environment of the vehicle 102. The traffic participant tracking module 132 can analyze the sets of object coordinates of the object(s) that is determined to be traffic participant(s) to estimate a direction in which the traffic participant(s) are heading relative to the vehicle 102. For example, the traffic participant tracking module 132 can determine if one of more traffic participant(s) are heading in a direction towards one of the sides/front/rear of vehicle 102 or away from vehicle 102.

Upon estimating the average velocity of the verified traffic participant(s) and the estimating the heading of the traffic participant(s) relative to the vehicle 102, the traffic participant tracking module 132 can track the traffic participant(s) at one or more future points in time to predict the velocity and heading of the traffic participant(s) as a predicted relative position of one or more traffic participants to the vehicle 102. It is to be appreciated that a predicted relative position of the traffic participant to the vehicle 102 can be utilized the ECU 104 to provide one or more vehicle collision avoidance functions that can include predictive warnings and/or collision avoidance to the vehicle 102.

The embodiments discussed herein may also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media may include volatile and nonvolatile, removable and non-removable media implemented in any method or technology for storage of information such as computer readable instructions, data structures, modules or other data. Non-transitory computer readable storage media excludes transitory and propagated data signals.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for providing laser camera fusion for identifying and tracking a traffic participant, comprising:
receiving an image of a surrounding environment of a vehicle from a vehicle camera system and a set of object coordinates of at least one object determined within the surrounding environment of the vehicle from a vehicle laser projection system;
determining a portion of the image as object space based on the set of object coordinates and at least one corresponding set of image coordinates, wherein the at least one corresponding set of image coordinates are two-dimensional coordinates that represent at least one pixel of the image that corresponds to at least one location within the image that is associated to the set of object coordinates;
filtering the object space to identify a traffic related object;
determining a three dimensional position of the traffic related object, wherein determining the three dimensional position of the traffic related object includes projecting the image and projecting a plurality of laser beam points from an image laser projection system to a plurality of pixels of the projected image of the surrounding environment of the vehicle, wherein determining a three dimensional position of the traffic related object includes determining a subset of clusters of a plurality of clusters found closest to a camera of the vehicle camera system based on an evaluation of a mean laser beam length value for each cluster against at least one predetermined laser length value; and
classifying the traffic related object as at least one of: the traffic participant, or a non-traffic participant;
tracking the traffic participant based on a three dimensional position of the traffic related object classified as the traffic participant, wherein a predicted position of the traffic participant relative to the vehicle is determined based on tracking the traffic participant; and
controlling at least one component of the vehicle to provide at least one vehicle collision avoidance function.

2. The computer-implemented method of claim 1, wherein determining the portion of the image as object space includes computing a horizon line of the image, a horizon space of the image, and a floor space of the image, wherein the horizon line is computed in a middle portion of the image, wherein the horizon space includes a portion of the image that is located above the horizon line and is located above a predetermined area where the traffic participant can be captured within the image, wherein the floor space includes a portion of the image that is located below the horizon line and includes the predetermined area where the traffic participant is captured within the image.

3. The computer-implemented method of claim 2, wherein determining the portion of the image as object space includes removing the horizon line and the horizon space from the image and determining a set of image coordinates included within the floor space of the image that corresponds to the set of object coordinates, wherein a remaining portion of the floor space of the image that includes the set of image coordinates that correspond to the set of object coordinates is determined as object space.

4. The computer-implemented method of claim 3, wherein filtering the object space includes determining at least one separate object within the image and identifying the at least one separate object as at least one of: the traffic related object or the non-traffic related object, wherein a bounding box is computed around the traffic related object and the traffic related object is included within the bounding box, wherein the non-traffic related object is removed from the image.

5. The computer-implemented method of claim 1, wherein a subset of laser beam points of the plurality of laser beam points that are projected to a subset of pixels of the image included within the bounding box are grouped into a plurality of clusters, wherein mean three dimensional coordinates are computed for each cluster of the plurality of clusters.

6. The computer-implemented method of claim 5, wherein determining a three dimensional position of the traffic related object includes determining the subset of clusters of the plurality of clusters found closest to a camera of the vehicle camera system that captures the image based on determining that a measured length of the mean laser beam length is less than or equal to the predetermined laser length value, and determining the subset of clusters of the plurality of clusters found furthest from the camera that captures the image based on determining that the measured length of the mean laser beam length is more than the predetermined laser length value.

7. The computer-implemented method of claim 6, wherein determining a three dimensional position of the traffic related object includes removing the subsets of pixels from the bounding box that have laser beam points projected toward them from the subsets of clusters found furthest from the camera that captures the image, wherein a resized bounding box is computed around the subsets of pixels from the bounding box that have laser beams projected toward them from the subsets of clusters found closest to the camera that captures the image, wherein the traffic related object is included within the resized bounding box.

8. The computer-implemented method of claim 7, wherein classifying the traffic related object includes determining a measurement of the resized bounding box, wherein the measurement of the resized bounding box is compared against a minimum threshold measurement value and a maximum threshold measurement value, wherein the traffic related object is classified as at least one of: the traffic participant when the measurement of the resized bounding box is within the minimum threshold measurement value and the maximum threshold measurement value, or the non-traffic participant when the measurement of the resized bounding box is outside of the minimum threshold measurement value and the maximum threshold measurement value.

9. The computer-implemented method of claim 8, wherein tracking the traffic participant includes receiving three dimensional coordinates of the traffic participant, wherein the three dimensional coordinates of the traffic participant provided at a future time frame are analyzed with previous three dimensional coordinates of the traffic participants provided at a previous time frame to determine a difference in distance traveled, wherein the difference is distance traveled is analyzed to estimate an average velocity of the traffic participant.

10. A system for providing laser camera fusion for identifying and tracking a traffic participant, comprising:
a memory storing instructions when executed by a processor cause the processor to:
receive an image of a surrounding environment of the vehicle from a vehicle camera system and a set of object coordinates of at least one object determined within the surrounding environment of the vehicle from a vehicle laser projection system;
determine a portion of the image as object space based the set of object coordinates and at least one corresponding set of image coordinates, wherein the at least one corresponding set of image coordinates are two-dimensional coordinates that represent at least one pixel of the image that corresponds to at least one location within the image that is associated to the set of object coordinates;
filter the object space to identify a traffic related object;
determine a three dimensional position of the traffic related object, wherein determining the three dimensional position of the traffic related object includes projecting the image and projecting a plurality of laser beam points from an image laser projection system to a plurality of pixels of the projected image of the surrounding environment of the vehicle, wherein determining a three dimensional position of the traffic related object includes determining a subset of clusters of a plurality of clusters found closest to a camera of the vehicle camera system based on an evaluation of a mean laser beam length value for each cluster against at least one predetermined laser length value;
classify the traffic related object as at least one of: the traffic participant, or a non-traffic participant;
track the traffic participant based on a three dimensional position of the traffic related object classified as the traffic participant, wherein a predicted position of the traffic participant relative to the vehicle is determined based on tracking the traffic participant; and
control at least one component of the vehicle to provide at least one vehicle collision avoidance function.

11. The system of claim 10, wherein determining the portion of the image as object space includes computing a horizon line of the image, a horizon space of the image, and a floor space of the image, wherein the horizon line is computed in a middle portion of the image, wherein the horizon space includes a portion of the image that is located above the horizon line and is located above a predetermined area where the traffic participant can be captured within the image, wherein the floor space includes a portion of the image that is located below the horizon line and includes the predetermined area where a traffic participant is captured within the image.

12. The system of claim 11, wherein determining the portion of the image as object space includes removing the horizon line and the horizon space from the image and determines a set of image coordinates included within the floor space of the image that corresponds to the set of object coordinates, wherein a remaining portion of the floor space of the image that includes the set of image coordinates that correspond to the set of object coordinates is determined as object space.

13. The system of claim 12, wherein filtering the object space includes determining at least one separate object within the image and identifying the at least one separate object as at least one of: the traffic related object or the non-traffic related object, wherein the object space filtering module computes a bounding box around the traffic related object and the traffic related object is included within the bounding box, wherein the non-traffic related object is removed from the image.

14. The system of claim 10, wherein a subset of laser beam points of the plurality of laser beam points that are projected to a subset of pixels of the image included within the bounding box are grouped into a plurality of clusters, wherein mean three dimensional coordinates are computed for each cluster of the plurality of clusters.

15. The system of claim 14, wherein determining a three dimensional position of the traffic related object includes determining the subset of clusters of the plurality of clusters found closest to a camera that captures the image based on determining that a measured length of the mean laser beam length is less than or equal to the predetermined laser length value, and determining a subset of clusters of the plurality of clusters found furthest from the camera that captures the image based on determining that the measured length of the mean laser beam length is more than the predetermined laser length value.

16. The system of claim 15, wherein determining a three dimensional position of the traffic related object includes removing the subsets of pixels from the bounding box that have laser beam points projected toward them from the subsets of clusters found furthest from the camera that captures the image, wherein the positional determinant module computes a resized bounding box around the subsets of pixels from the bounding box that have laser beams projected toward them from the subsets of clusters found closest to the camera that captures the image, wherein the traffic related object is included within the resized bounding box.

17. The system of claim 16, wherein classifying the traffic related object includes determining a measurement of the resized bounding box, wherein the measurement of the resized bounding box is compared against a minimum threshold measurement value and a maximum threshold measurement value, wherein the traffic related object is classified as at least one of: the traffic participant when the measurement of the resized bounding box is within the minimum threshold measurement value and the maximum threshold measurement value, or the non-traffic participant when the measurement of the resized bounding box is outside of the minimum threshold measurement value and the maximum threshold measurement value.

18. The system of claim 17, wherein tracking the traffic participant includes receiving three dimensional coordinates of the traffic participant, wherein the three dimensional coordinates of the traffic participant provided at a future time frame are analyzed with previous three dimensional coordinates of the traffic participants provided at a previous time frame to determine a difference in distance traveled, wherein the difference is distance traveled is analyzed to estimate an average velocity of the traffic participant.

19. A non-transitory computer-readable storage medium storing instructions that when executed by a processor performs actions, comprising:
receiving an image of a surrounding environment of a vehicle from a vehicle camera system and a set of object coordinates of at least one object determined within the surrounding environment of the vehicle from a vehicle laser projection system;

determining a portion of the image as object space based on the set of object coordinates and at least one corresponding set of image coordinates, wherein the at least one corresponding set of image coordinates are two-dimensional coordinates that represent at least one pixel of the image that corresponds to at least one location within the image that is associated to the set of object coordinates;

filtering the object space to identify a traffic related object;

filtering the object space to identify a traffic related object;

determining a three dimensional position of the traffic related object, wherein determining the three dimensional position of the traffic related object includes projecting the image and projecting a plurality of laser beam points from an image laser projection system to a plurality of pixels of the projected image of the surrounding environment of the vehicle, wherein determining a three dimensional position of the traffic related object includes determining a subset of clusters of a plurality of clusters found closest to a camera of the vehicle camera system based on an evaluation of a mean laser beam length value for each cluster against at least one predetermined laser length value; and classifying the traffic related object as at least one of: a traffic participant, or a non-traffic participant;

tracking the traffic participant based on a three dimensional position of the traffic related object classified as the traffic participant, wherein a predicted position of the traffic participant relative to the vehicle is determined based on tracking the traffic participant; and controlling at least one component of the vehicle to provide at least one vehicle collision avoidance function.

20. The non-transitory computer readable storage medium of claim 19, wherein tracking the traffic participant includes receiving three dimensional coordinates of the traffic participant, wherein the three dimensional coordinates of the traffic participant provided at a future time frame are analyzed with previous three dimensional coordinates of the traffic participants provided at a previous time frame to determine a difference in distance traveled, wherein the difference is distance traveled is analyzed to estimate an average velocity of the traffic participant.

* * * * *